(12) United States Patent
Kumagai et al.

(10) Patent No.: US 8,593,077 B2
(45) Date of Patent: Nov. 26, 2013

(54) HIGH-VOLTAGE DISCHARGE LAMP LIGHTING DEVICE AND LIGHTING FIXTURE

(75) Inventors: Jun Kumagai, Suita (JP); Naoki Komatsu, Kobe (JP)

(73) Assignee: Panasonic Corporation, Osaka (JP)

( * ) Notice: Subject to any disclaimer, the term of this patent is extended or adjusted under 35 U.S.C. 154(b) by 445 days.

(21) Appl. No.: 12/994,469

(22) PCT Filed: May 12, 2009

(86) PCT No.: PCT/JP2009/058817
§ 371 (c)(1),
(2), (4) Date: Nov. 24, 2010

(87) PCT Pub. No.: WO2009/145050
PCT Pub. Date: Dec. 3, 2009

(65) Prior Publication Data
US 2011/0074311 A1    Mar. 31, 2011

(30) Foreign Application Priority Data

May 27, 2008  (JP) .................................. 2008-138634

(51) Int. Cl.
*H05B 37/00*    (2006.01)
(52) U.S. Cl.
USPC ............................ 315/307; 315/308; 315/291
(58) Field of Classification Search
USPC ................. 315/224, 225, 308, 207, 309, 291, 315/209 R, 219
See application file for complete search history.

(56) References Cited

U.S. PATENT DOCUMENTS

| | | | |
|---|---|---|---|
| 5,907,224 A * | 5/1999 | Yamashita et al. | 315/308 |
| 7,615,937 B2 * | 11/2009 | Mishima | 315/291 |
| 2006/0055344 A1 | 3/2006 | Muramatsu et al. | |

(Continued)

FOREIGN PATENT DOCUMENTS

| | | | | |
|---|---|---|---|---|
| JP | 2000-133482 | | 5/2000 | |
| JP | 2000133482 A | * | 5/2000 | ............. H05B 41/24 |

(Continued)

OTHER PUBLICATIONS

Japan Office action, mail date is Jul. 10, 2012, along with an English language translation thereof.

(Continued)

*Primary Examiner* — Douglas W Owens
*Assistant Examiner* — Amy Yang
(74) *Attorney, Agent, or Firm* — Greenblum & Bernstein, P.L.C.

(57) ABSTRACT

A device includes a direct current power circuit configured to convert an alternating current voltage from an alternating current power source into a direct current voltage, an output unit configured to convert a direct current from the direct current power circuit into a square wave alternating current whose polarity is inverted at a prescribed frequency and to supply the square wave alternating current to a high-pressure discharge lamp, a controller, and an anomaly detector configured to detect an instantaneous voltage drop of the alternating current power source. When the anomaly detector detects the instantaneous voltage drop, the controller switches from a normal lighting mode of controlling the output unit to supply the high-pressure discharge lamp with a square wave alternating current to a lighting maintained mode of controlling the output unit to supply the high-pressure discharge lamp with a square wave alternating current having a lower frequency than the square wave alternating current in the normal lighting mode. In this way, it is possible to maintain lighting of the high-pressure discharge lamp even upon occurrence of an instantaneous power failure, an instantaneous voltage drop, and the like.

6 Claims, 8 Drawing Sheets

(56) References Cited

U.S. PATENT DOCUMENTS

2009/0315470 A1  12/2009  Kumagai et al.
2010/0084988 A1  4/2010  Nagata et al.

FOREIGN PATENT DOCUMENTS

| | | |
|---|---|---|
| JP | 2001-319794 | 11/2001 |
| JP | 2001319794 A * | 11/2001 ............ H05B 41/24 |
| JP | 2004-303507 | 10/2004 |
| JP | 2007-257989 | 10/2007 |
| JP | 2008-052998 | 3/2008 |

OTHER PUBLICATIONS

Search report from E.P.O., mail date is Mar. 7, 2012.

* cited by examiner

FIG. 8

HIGH-VOLTAGE DISCHARGE LAMP LIGHTING DEVICE AND LIGHTING FIXTURE

TECHNICAL FIELD

The present invention relates to a lighting device for a high-pressure discharge lamp and a lighting fixture using the same.

BACKGROUND ART

A discharge lamp lighting device (a high-pressure discharge lamp lighting device) has heretofore been proposed which is used for lighting a high-pressure discharge lamp (also referred to as a high-intensity discharge lamp or a HID lamp) such as a metal halide lamp or a high-pressure mercury lamp.

Figure 1:
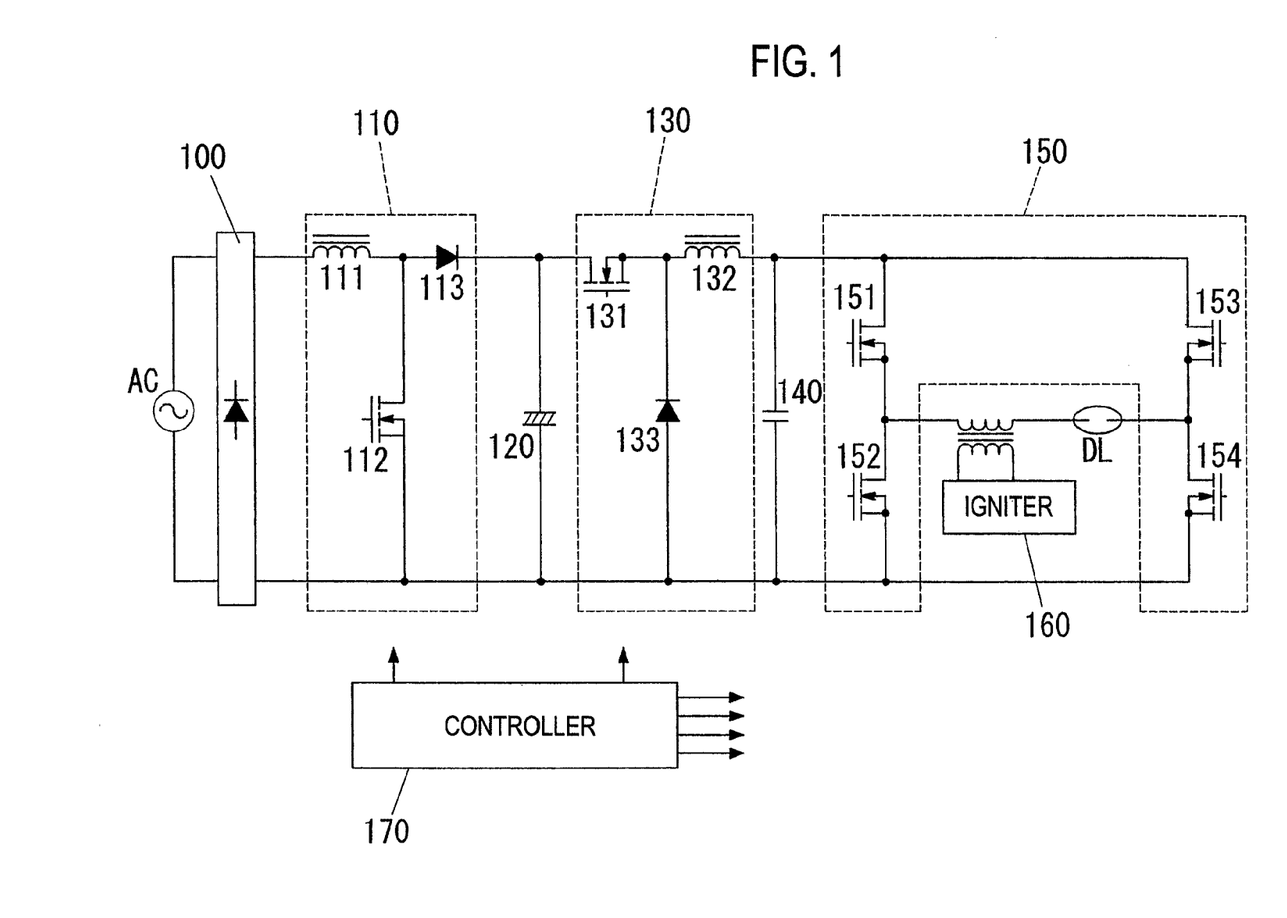
FIG. 1 is a circuit configuration diagram of a conventional high-pressure discharge lamp lighting device.

As shown in FIG. 1, a high-pressure discharge lamp lighting device of this type includes a rectifier 100 such as a diode bridge that performs full-wave rectification of an alternating electric current supplied from an alternating current power source AC, a step-up chopper circuit 110 that steps up an output voltage from the rectifier 100 to a prescribed value, a smoothing capacitor 120 that smoothes an output voltage from the step-up chopper circuit 110, a step-down chopper circuit 130 that steps down the output voltage from the step-up chopper circuit 110 to a prescribed value, a smoothing capacitor 140 that smoothes an output voltage from the step-down chopper circuit 130, an inverter circuit 150 that converts a direct electric current outputted from the step-down chopper circuit 130 into a square wave alternating current (a square wave alternating electric current) whose polarity is inverted at a prescribed frequency, and supplies the square wave alternating current to a high-pressure discharge lamp DL, an igniter 160 that applies a starting voltage to the high-pressure discharge lamp DL, and a controller 170 that controls operations of the respective circuits.

In the device shown in FIG. 1, the step-up chopper circuit 110 includes an inductor 111, a switching element 112, and a diode 113. The step-down chopper circuit 130 includes a switching element 131, an inductor 132, and a diode 133. The inverter circuit 150 is a full-bridge circuit which includes four switching elements 151 to 154. The controller 170 lights the high-pressure discharge lamp DL by performing on-off control of the switching element 112 in the step-up chopper circuit 110, the switching element 131 in the step-down chopper circuit 130, and the switching elements 151 to 154 in the inverter circuit 150.

If the alternating current power source AC stops supplying the power to the high-pressure discharge lamp lighting device shown in FIG. 1, the voltage between two terminals of the smoothing capacitor 120 drops. When the voltage drops to a certain level, the high-pressure discharge lamp DL cannot continue to be lit any more, and is extinguished.

As described previously, the high-pressure discharge lamp DL is a metal halide lamp, a high-pressure mercury lamp or the like. In the high-pressure discharge lamp DL of this type, arc discharge is initiated after glow discharge, and a lamp voltage thereafter becomes almost constant when a temperature inside an arc tube becomes uniform and stabilized. The high-pressure discharge lamp DL is lit by way of the process described above. Thus, once the lamp DL is extinguished, it is not possible to restart (resume lighting) until the temperature and pressure inside the arc tube are decreased (taking 5 to 15 minutes usually).

Therefore, once the lamp DL is extinguished, it takes time to restart the lamp DL even in a case of a power failure of only a short period (for 10 to 20 ms), such as an instantaneous power failure or an instantaneous voltage drop of the alternating current source AC due to a lightening strike, a start of large electric equipment in the neighborhood, a short-circuit accident, and the like.

One of conceivable methods for solving this problem is to increase a capacity of the smoothing capacitor 120 so that the smoothing capacitor 120 can supply sufficient power to the high-pressure discharge lamp DL during an instantaneous power failure.

However, the increase in the capacity of the smoothing capacitor 120 leads to increases in size, costs, weight, and the like of the high-pressure discharge lamp lighting device. Such increases cannot meet recent market demands for reducing the size, costs, and weight of high-pressure discharge lamp lighting devices.

Accordingly, in order to prevent extinction of the high-pressure discharge lamp DL attributable to an instantaneous power failure or an instantaneous voltage drop without increasing the capacity of the smoothing capacitor 120, there have been proposed techniques to prevent extinction of the high-pressure discharge lamp DL by reducing electrical energy supplied to the high-pressure discharge lamp DL and thereby suppressing power consumption upon occurrence of the instantaneous power failure or the instantaneous voltage drop (see Patent Documents 1 and 2, for example). Here, an amount of power supply to the high-pressure discharge lamp DL is decreased by reducing the output voltage from the step-down chopper circuit 130 in Patent Document 1, and by reducing the output voltage from the step-up chopper circuit 110 in Patent Document 2.

CITATION LIST

Patent Literature

PLT 1: Japanese Unexamined Patent Application Publication No. 2007-257989

PLT 2: Japanese Unexamined Patent Application Publication No. 2004-303507

SUMMARY OF INVENTION

Technical Problem

However, the decreasing of the amount of power supply to the high-pressure discharge lamp DL as disclosed in the above-described Patent Documents 1 and 2 produces a problem that a restriking voltage occurs in the high-pressure discharge lamp DL.

Specifically, since the high-pressure discharge lamp DL is supplied with the square wave alternating current whose polarity (positive and negative) is inverted at a prescribed frequency, the lamp current momentarily becomes 0 when the polarity is inverted. In the course of lighting again the high-pressure discharge lamp DL immediately after the polarity inversion, the lamp voltage precedes and rise of the lamp current is delayed. This transiently increases impedance. As a consequence, a restriking voltage that rises abruptly after zero cross occurs in the lamp voltage. If there is no sufficient power at that moment, the high-pressure lamp DL is extinguished.

Although achieving downsizing of the smoothing capacitor 120, the above-described techniques shown in Patent Documents 1 and 2 have another problem that the high-pressure discharge lamp DL is extinguished due to the restriking voltage. Hence, these techniques are insufficient to maintain lighting of the high-pressure discharge lamp DL.

The present invention has been made in view of the foregoing problems and an object thereof is to provide a high-pressure discharge lamp lighting device and a lighting fixture, which are capable of maintaining lighting of a high-pressure discharge lamp even upon occurrence of an instantaneous power failure, an instantaneous voltage drop, and the like.

Solution to Problem

A first aspect of the present invention is a lighting device for a high-pressure discharge lamp comprising: a direct current power circuit configured to convert an alternating current voltage supplied from an alternating current power source into a direct current voltage; an output unit configured to convert a direct current obtained from the direct current power circuit into a square wave alternating current whose polarity is inverted at a prescribed frequency and to supply the square wave alternating current to the high-pressure discharge lamp; a controller configured to control the output unit; and an anomaly detector configured to detect an instantaneous drop in voltage of the alternating current power source, wherein the controller is configured upon detection of an instantaneous drop in voltage by the anomaly detector to switch from a normal lighting mode of controlling the output unit so that the output unit supplies the high-pressure discharge lamp with a square wave alternating current, to a lighting maintained mode of controlling the output unit so that the output unit supplies the high-pressure discharge lamp with a square wave alternating current having a lower frequency than the square wave alternating current in the normal lighting mode.

According to the invention of claim 1, the frequency of the square wave alternating current to be supplied to the high-pressure discharge lamp is lower than that in the normal lighting mode upon occurrence of an instantaneous power failure, an instantaneous voltage drop, and the like. Hence it is possible to reduce the number of times of polarity inversion per unit time as compared to a case where the same frequency as that in the normal lighting mode is used. Therefore, the number of occurrences of the restriking voltage attributable to the polarity inversion is reduced. Thus, it is possible to suppress extinction of the high-pressure discharge lamp due to the restriking voltage and to maintain lighting of the high-pressure discharge lamp. Moreover, it is not necessary to increase the capacity of the smoothing capacitor provided in the direct current power circuit, thereby enabling downsizing as a whole.

A second aspect of the present invention is a lighting device for a high-pressure discharge lamp comprising: a direct current power circuit configured to convert an alternating current voltage supplied from an alternating current power source into a direct current voltage; an output unit configured to convert a direct current obtained from the direct current power circuit into any of a square wave alternating current whose polarity is inverted at a prescribed frequency and a fixed polarity current having a fixed polarity, and to supply the any of the currents to the high-pressure discharge lamp; a controller configured to control the output unit; and an anomaly detector configured to detect an instantaneous drop in voltage of the alternating current power source, wherein the controller is configured upon detection of an instantaneous drop in voltage by the anomaly detector to switch from a normal lighting mode of controlling the output unit so that the output unit supplies the high-pressure discharge lamp with a square wave alternating current, to a lighting maintained mode of controlling the output unit so that the output unit supplies the high-pressure discharge lamp with a fixed polarity current.

According to the invention of claim 2, the fixed polarity current having the fixed polarity is supplied to the high-pressure discharge lamp instead of the square wave alternating current upon occurrence of an instantaneous power failure, an instantaneous voltage drop, and the like. Hence the polarities are not inverted unlike the normal lighting mode. Therefore, the restriking voltage attributable to the polarity inversion is not generated. Thus, it is possible to prevent extinction of the high-pressure discharge lamp due to the restriking voltage and to maintain lighting of the high-pressure discharge lamp. Moreover, it is not necessary to increase the capacity of the smoothing capacitor provided in the direct current power circuit, thereby enabling downsizing as a whole.

The polarity of the fixed polarity current may be constant irrespective of an immediately preceding polarity of the square wave alternating current.

According to the invention of claim 3, the polarity of the fixed polarity current in the lighting maintained mode is constant irrespective of the immediately preceding polarity of the square wave alternating current when switched from the normal lighting mode to the lighting maintained mode. Hence it is possible to maintain lighting of the high-pressure discharge lamp without being influenced by the polarity of the square wave alternating current.

The controller may be configured to control the output unit so that the high-pressure discharge lamp consumes a smaller amount of power in the lighting maintained mode than in the normal lighting mode.

According to the invention of claim 4, it is possible to reduce the capacity of the smoothing capacitor provided in the direct current power circuit and to achieve further downsizing.

The anomaly detector may be configured to detect at least one of a voltage corresponding to the voltage of the alternating current power source and an output voltage from the direct current power circuit, and upon drop of the detected voltage to a value below a prescribed threshold to determine occurrence of the instantaneous drop in voltage.

According to the invention of claim 5, it is possible to detect an instantaneous power failure or an instantaneous voltage drop by using a simple circuit configuration.

The anomaly detector may be configured to determine termination of the instantaneous drop in voltage upon rise of the detected voltage to a value greater than or equal to the prescribed threshold following the drop of the detected voltage to a value below the prescribed threshold, and the controller may be configured to switch from the lighting maintained mode to the normal lighting mode upon determination of the termination of the instantaneous drop in voltage by the anomaly detector.

According to the invention of claim 6, the mode is automatically switched from the lighting maintained mode to the normal lighting mode when the instantaneous power failure or the instantaneous voltage drop is resolved. Hence it is not necessary to perform an operation to switch from the lighting maintained mode to the normal lighting mode manually, thereby improving usability.

The prescribed threshold may be a value being lower than the detected voltage in a normal state by a prescribed value for prevention of false detection.

According to the invention of claim 7, it is possible to suppress false detection of an instantaneous power failure or an instantaneous voltage drop.

A third aspect of the present invention is a lighting fixture comprising: a lighting device for a high-pressure discharge lamp including a direct current power circuit configured to convert an alternating current voltage supplied from an alternating current power source into a direct current voltage, an output unit configured to convert a direct current obtained from the direct current power circuit into a square wave alternating current whose polarity is inverted at a prescribed frequency and to supply the square wave alternating current to the high-pressure discharge lamp, a controller configured to control the output unit, and an anomaly detector configured to detect an instantaneous drop in voltage of the alternating current power source, wherein the controller is configured upon detection of an instantaneous drop in voltage by the anomaly detector to switch from a normal lighting mode of controlling the output unit so that the output unit supplies the high-pressure discharge lamp with a square wave alternating current, to a lighting maintained mode of controlling the output unit so that the output unit supplies the high-pressure discharge lamp with a square wave alternating current having a lower frequency than the square wave alternating current in the normal lighting mode; and a fixture body for mounting the high-pressure discharge lamp to be lit by the lighting device for the high-pressure discharge lamp.

A fourth aspect of the present invention is a lighting fixture comprising: a lighting device for a high-pressure discharge lamp including a direct current power circuit configured to convert an alternating current voltage supplied from an alternating current power source into a direct current voltage, an output unit configured to convert a direct current obtained from the direct current power circuit into any of a square wave alternating current whose polarity is inverted at a prescribed frequency and a fixed polarity current having a fixed polarity, and to supply the any of the currents to the high-pressure discharge lamp, a controller configured to control the output unit, and an anomaly detector configured to detect an instantaneous drop in voltage of the alternating current power source, wherein the controller is configured upon detection of an instantaneous drop in voltage by the anomaly detector to switch from a normal lighting mode of controlling the output unit so that the output unit supplies the high-pressure discharge lamp with a square wave alternating current, to a lighting maintained mode of controlling the output unit so that the output unit supplies the high-pressure discharge lamp with a fixed polarity current; and a fixture body for mounting the high-pressure discharge lamp to be lit by the lighting device for the high-pressure discharge lamp.

According to the invention of claim 8, it is possible to maintain lighting of the high-pressure discharge lamp upon occurrence of an instantaneous power failure, an instantaneous voltage drop, and the like, and to achieve downsizing as well.

Advantageous Effects of Invention

The present invention has an effect such that lighting of a high-pressure discharge lamp can be maintained even upon occurrence of an instantaneous power failure, an instantaneous voltage drop, and the like.

DESCRIPTION OF EMBODIMENTS

First Embodiment

Figure 2:
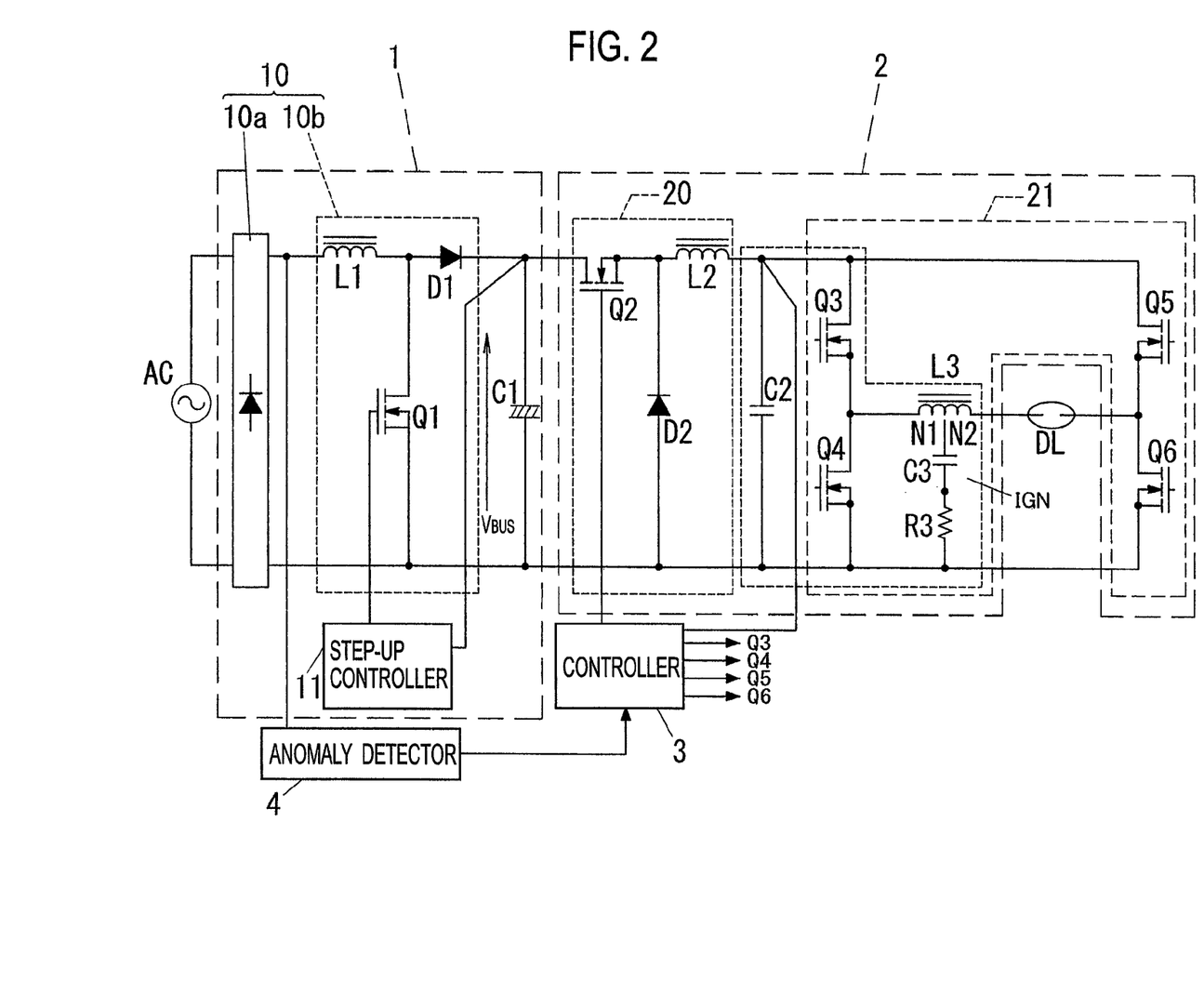
FIG. 2 is a circuit configuration diagram of a high-pressure discharge lamp lighting device according to a first embodiment.

As shown in FIG. 2, a high-pressure discharge lamp lighting device of this embodiment includes a direct current power circuit 1 that converts an alternating current voltage to be supplied form an alternating current power source AC into a direct current voltage, an output unit 2 that converts a direct current outputted from the direct current power circuit 1 into a square wave alternating current whose polarity is inverted at a prescribed frequency and supplies the square wave alternating current to a high-pressure discharge lamp DL, a controller 3 that controls the output unit 2, and an anomaly detector 4 that detects an instantaneous drop in voltage (i.e., an instantaneous power failure or an instantaneous voltage drop) of the alternating current power source AC. Note that a commercial alternating current power having a frequency of 60 Hz and an effective value (a nominal value) of 100 V is assumed as the alternating current power source AC in this embodiment.

Figure 3:
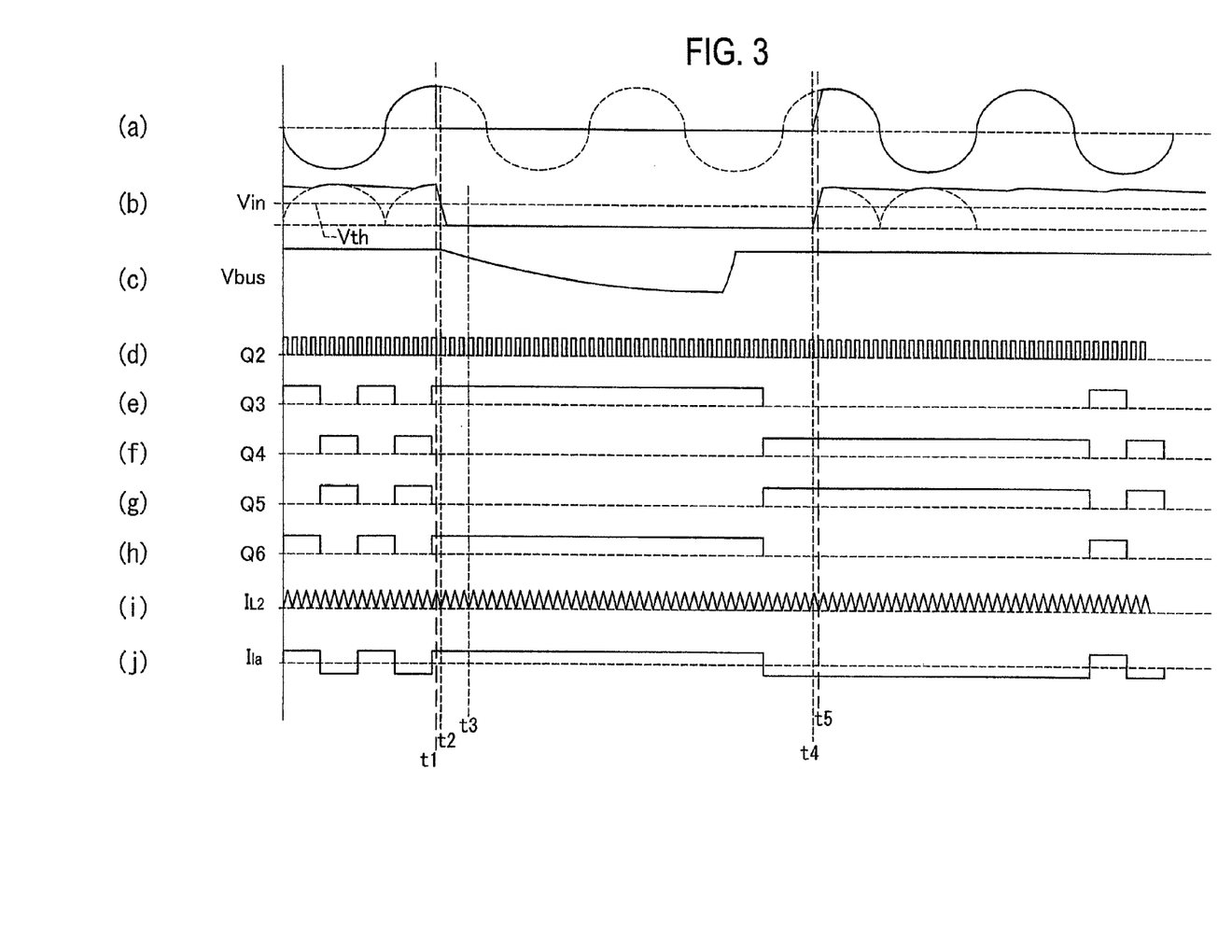
FIG. 3 is a waveform chart for explaining operations of the aforementioned high-pressure discharge lamp lighting device.

The direct current power circuit 1 includes an AC-DC conversion circuit 10 that converts the alternating current voltage (see FIG. 3(a)) provided from the alternating current power source AC into the direct current voltage, and a smoothing capacitor C1 that smoothes an outputted from the AC-DC conversion circuit 10.

The AC-DC conversion circuit 10 includes a rectifier 10a such as a diode bridge that performs full-wave rectification of an alternating electric current from the alternating current power source AC, and a step-up chopper circuit 10b that steps up an output voltage from the rectifier 10a to a prescribed value. The step-up chopper circuit 10b includes an inductor L1 having one end connected to a terminal on a high potential side of the rectifier 10a and the other end connected to a terminal on a high potential side of the smoothing capacitor C1 through a diode D1, and a switching element Q1 such as a MOSFET inserted between the other end of the inductor L1 and a terminal on a low potential side of the rectifier 10a. Here, an anode of the diode D1 is connected to the inductor L1 and a cathode thereof is connected to the terminal on the high potential side of the smoothing capacitor C1.

Moreover, the direct current power circuit 1 includes a step-up controller 11 that controls the switching element Q1 in the step-up chopper circuit 10b. The step-up controller 11 is formed of a power factor improvement IC (model number:

MC33262) made by ON Semiconductor Corporation, for example, and executes on-off control of the switching element Q1 so as to render an output voltage VBUS from the direct current power circuit 1 (see FIG. 3(c)) equal to a prescribed value, the output voltage VBUS being a voltage between both of the terminals of the smoothing capacitor C1. Here, the step-up chopper circuit 10b of this type is publicly known and description thereof will be omitted.

The output unit 2 includes a step-down chopper circuit 20 that steps down the output voltage VBUS from the direct current power circuit 1 to a prescribed value, a smoothing capacitor C2 that smoothes an output voltage from the step-down chopper circuit 20, and an inverter circuit (a polarity inversion circuit) 21.

The step-down chopper circuit 20 includes an inductor L2, a switching element Q2 such as a MOSFET inserted between one end of the inductor L2 and the terminal on the high potential side of the smoothing capacitor C1, and a diode D2 inserted between the one end of the inductor L2 and the terminal on the low potential side of the rectifier 10a. Here, an anode of the diode D2 is connected to the terminal on the low potential side of the rectifier 10a and a cathode thereof is connected to the inductor L2.

The inverter circuit 21 includes a full-bridge circuit provided with a series circuit formed of switching elements Q3 and Q4 and with a series circuit formed of switching elements Q5 and Q6, the series circuits each connected in parallel to the smoothing capacitor C2. In this full-bridge circuit, the high-pressure discharge lamp DL is inserted between a connecting point of the switching element Q3 to the switching element Q4 and a connecting point of the switching element Q5 to the switching element Q6.

Incidentally, a secondary winding N2 of a transformer T3 formed of an autotransformer is inserted between the connecting point of the switching element Q3 to the switching element Q4 and the high-pressure discharge lamp DL. A primary winding N1 of the transformer T3 is connected to the terminal on the low potential side of the rectifier 10a through a series circuit formed of a capacitor C3 and a resistor R3.

In the output unit 2 of this embodiment, the smoothing capacitor C2, the switching elements Q3 and Q4, the transformer T3, the capacitor C3, and the resistor R3 collectively constitute an ignition circuit (an igniter) IGN that supplies a starting voltage to the high-pressure discharge lamp DL. In this ignition circuit IGN, the switching elements Q3 and Q4 are turned on and off at a high frequency (for example, a resonant frequency of a resonant circuit formed of the primary winding N1 of the transformer L3 and the capacitor C3, or a frequency to be defined as the resonant frequency divided by an integer, which ranges from several tens to several hundreds of kilohertz in this embodiment). Accordingly, a resonant voltage generated on the primary winding N1 is stepped up by using the secondary winding N2 (a step up ratio is determined by a winding ratio between the primary winding N1 and the secondary winding N2), thereby supplying the starting voltage to the high-pressure discharge lamp DL. Here, the igniter IGN of this type is publicly known and detailed description thereof will be omitted.

The anomaly detector 4 detects a voltage corresponding to the voltage of the alternating current power source AC and determines occurrences of an instantaneous drop in voltage such as an instantaneous power failure or an instantaneous voltage drop when the voltage thus detected (i.e., a detected voltage) falls below a prescribed threshold. In this embodiment, the anomaly detector 4 detects a voltage Vin (see FIG. 3(b)) obtained by smoothing the output voltage from the rectifier 10a as the voltage corresponding to the voltage of the alternating current power source AC, and compares this detected voltage Vin with a prescribed threshold Vth with an unillustrated comparator, for example. Thereafter, the anomaly detector 4 determines occurrence of a voltage anomaly such as the instantaneous power failure or the instantaneous voltage drop when the detected voltage Vin falls below the threshold Vth and then outputs an anomaly detection signal to the controller 3. The anomaly detector 4 determines that the instantaneous drop in voltage is terminated when the detected voltage Vin reaches and exceeds the threshold Vth after outputting the anomaly detection signal (in other words, after the detected voltage Vin falls below the threshold Vth), and then outputs a return signal to the controller 3.

As described above, the anomaly detector 4 of this embodiment detects the voltage Vin corresponding to the voltage of the alternating current power source AC and determines occurrence of the instantaneous drop in voltage when this voltage Vin (the detected voltage) falls below the threshold Vth. Hence it is possible to detect the instantaneous power failure or the instantaneous voltage drop by using a simple circuit configuration including the comparator and the like.

Here, the threshold Vth is defined as a value which is lower by a prescribed value provided for preventing false detection than the detected voltage Vin obtained in a normal state. The prescribed value for preventing false detection is the value which is greater than a variation value of the detected voltage Vin, the variation value associated with voltage variation of the alternating current power source AC in the normal state. Such a variation value can be obtained by measuring an actual variation value of the detected voltage Vin. In this embodiment, a value being 10% of the detected voltage Vin is defined as a minimum value of the prescribed value for preventing false detection. For example, take a case where the alternating current power source AC is the commercial alternating current power source having the effective value of 100 V as described previously. Here, even if the effective value of the commercial alternating current power source drops to 90 V, the threshold Vth is set to such value that this change in the effective value is not falsely detected as the instantaneous power failure or the instantaneous voltage drop. In this way, even if the detected voltage Vin varies due to the voltage variation of the alternating current power source AC in the normal state, it is still possible to suppress a case where such variation is falsely detected as the instantaneous power failure or the instantaneous voltage drop.

The controller 3 includes, as a principal constituent, a microcomputer or the like configured to execute a variety of processing in accordance with a program stored in a memory, for example, and mainly performs on-off control of the switching element Q2 in the step-down chopper circuit 20 and on-off control of the switching elements Q3 to Q6 in the inverter circuit 21. Here, the control of the respective switching elements Q2 to Q6 is achieved by supplying PWM signals from the controller 3.

As shown in FIG. 3(d), the controller 3 performs on-off control of the switching element Q2 and thereby supplies a triangular wave current IL2 to the inductor L2 as shown in FIG. 3(i). This current IL2 is smoothed by the smoothing capacitor C2 and is supplied to the high-pressure discharge lamp DL as a current Ila (see FIG. 3(j)). Here, polarities of the current Ila are determined by the on-off states of the switching elements Q3 to Q6 in the inverter circuit 21. In this embodiment, as shown in FIGS. 3(e) and 3(h), the polarity of the current Ila is positive when the switching elements Q3 and Q6 are turned on while the switching elements Q4 and Q5 are turned off, and the polarity of the current Ila is negative when the switching elements Q4 and Q5 are turned on while the switching elements Q3 and Q6 are turned off.

Here, the high-pressure discharge lamp DL has characteristics that arc discharge is initiated by way of glow discharge after causing a breakdown and that a lamp voltage thereafter becomes almost constant when a temperature inside an arc tube becomes uniform and stabilized. That is to say, it is necessary to cause the breakdown in order to light the high-pressure discharge lamp DL.

Accordingly, when lighting the high-pressure discharge lamp DL, the controller 3 operates in a starting mode in which on-off control of the switching elements Q3 and Q4 in the inverter circuit 20 is performed at a high frequency as described above in order to apply the starting voltage between electrodes of the high-pressure discharge lamp DL by way of the ignition circuit IGN. After causing the breakdown in the high-pressure discharge lamp DL, in order to supply the square wave alternating current from the output unit 2 to the high-pressure discharge lamp DL, the controller 3 operates in a normal lighting mode to thus control the output unit 2.

In this normal lighting mode, as shown in FIGS. 3(e) to 3(h), the controller 3 repeats the control to turn on the switching elements Q3 and Q6 and to turn off the switching elements Q4 and Q5 and the control to turn on the switching elements Q4 and Q5 and to turn off the switching elements Q3 and Q6 alternately at a prescribed cycle. As shown in FIG. 3(j) this converts the current Ila into the square wave alternating current of a prescribed frequency and the alternating current is supplied to the high-pressure discharge lamp DL. Thus, the high-pressure discharge lamp DL is lit stably.

Meanwhile, the controller 3 switches to a lighting maintained mode upon receipt of the anomaly detection signal from the anomaly detector 4 (i.e., when the instantaneous drop in voltage is detected by the anomaly detector 4) during the operation in the normal lighting mode. In the lighting maintained mode, the controller 3 controls the output unit 2 so that the output unit 2 supplies the high-pressure discharge lamp with a square wave alternating current having a lower frequency than the square wave alternating current in the normal lighting mode. For example, the controller 3 of this embodiment controls the output unit 2 to supply a square wave alternating current having a frequency of 170 Hz in the normal lighting mode, and controls the output unit 2 to supply a square wave alternating current having a frequency of 31 Hz in the lighting maintained mode.

Moreover, the controller 3 switches from the lighting maintained mode to the normal lighting mode upon receipt of the return signal from the anomaly detector 4 (i.e., when the anomaly detector 4 determines that the instantaneous drop in voltage is terminated) during the operation in the lighting maintained mode.

Now, with reference to FIGS. 3(a) to 3(j), description is given below of an operation of the high-pressure discharge lamp lighting device of this embodiment, particularly, of an operation when the instantaneous power failure, the instantaneous voltage drop or the like occurs in the alternating current power source AC.

First, when the controller 3 operates in the normal lighting mode, the controller 3 performs the on-off control of the switching element Q2 as shown in FIG. 3(d) and repeats the control to turn on the switching elements Q3 and Q6 and to turn off the switching elements Q4 and Q5 and the control to turn on the switching elements Q4 and Q5 and to turn off the switching elements Q3 and Q6 alternately at the prescribed cycle as shown in FIGS. 3(e) to 3(h). Thus, the square wave alternating current of the prescribed frequency is supplied to the high-pressure discharge lamp DL (see FIGS. 3(i) and 3(j)).

Here, if there is an instantaneous power failure of the alternating current power source AC (time t1 in FIG. 3(a)), electric potential at the terminal on the high potential side of the rectifier 10a is decreased and the voltage Vin detected by the anomaly detector 4 is also decreased accordingly (see FIG. 3(b)). Then, as the detected voltage Vin falls below the threshold Vth (time t2), the anomaly detector 4 outputs the anomaly detection signal to the controller 3. Upon receipt of the anomaly detection signal, the controller 3 switches from the normal lighting mode to the lighting maintained mode (time t3). Thus, the square wave alternating current having the lower frequency than in the normal lighting mode is supplied to the high-pressure discharge lamp DL.

Thereafter, when the alternating current power source AC returns from the instantaneous power failure (time t4 in FIG. 3(a)), the electric potential at the terminal on the high potential side of the rectifier 10a is increased and the voltage Vin detected by the anomaly detector 4 is also increased accordingly (see FIG. 3(b)). Then, when the detected voltage Vin reaches and exceeds the threshold Vth (time t5), the anomaly detector 4 outputs the return signal to the controller 3. Upon receipt of the return signal, the controller 3 switches from the lighting maintained mode to the normal lighting mode. In the example shown in FIG. 3, the switching between the lighting maintained mode and the normal lighting mode takes place at a subsequent switching session of the switching elements Q3 to Q6.

As described above, according to the high-pressure discharge lamp lighting device of this embodiment, when the instantaneous drop in voltage is detected by the anomaly detector 4, the controller 3 switches from the normal lighting mode of controlling the output unit 2 so that the out put unit 2 supplies the high-pressure discharge lamp DL with the square wave alternating current, to the lighting maintained mode of controlling the output unit 2 so that the output unit 2 supplies the high-pressure discharge lamp DL with the square wave alternating current having the lower frequency than the square wave alternating current in the normal lighting mode.

According to the high-pressure discharge lamp lighting device of this embodiment, the frequency of the square wave alternating current to be supplied to the high-pressure discharge lamp DL is lower than that in the normal lighting mode upon occurrence of the instantaneous power failure, the instantaneous voltage drop or the like. Therefore, it is possible to reduce the number of polarity inversion per unit time as compared to the case where the frequency is the same as that in the normal lighting mode. Hence the number of occurrences of the restriking voltage attributable to the polarity inversion is reduced. Accordingly, it is possible to suppress extinction of the high-pressure discharge lamp DL due to the restriking voltage and to maintain lighting of the high-pressure discharge lamp DL. Moreover, it is not necessary to increase the capacity of the smoothing capacitor C1 provided in the direct current power circuit 1, thereby enabling downsizing as a whole.

In addition, the anomaly detector 4 determines that the instantaneous drop in voltage is terminated when the detected voltage Vin reaches and exceeds the threshold Vth after the detected voltage Vin falls below the threshold Vth, and outputs the return signal to the controller 3. Upon receipt of the recover signal, the controller 3 switches from the lighting maintained mode to the normal lighting mode.

Accordingly, the mode is automatically switched from the lighting maintained mode to the normal lighting mode when the instantaneous power failure or the instantaneous voltage drop is resolved. Hence it is not necessary to perform an operation to switch from the lighting maintained mode to the normal lighting mode manually, thereby improving usability.

Figure 4:
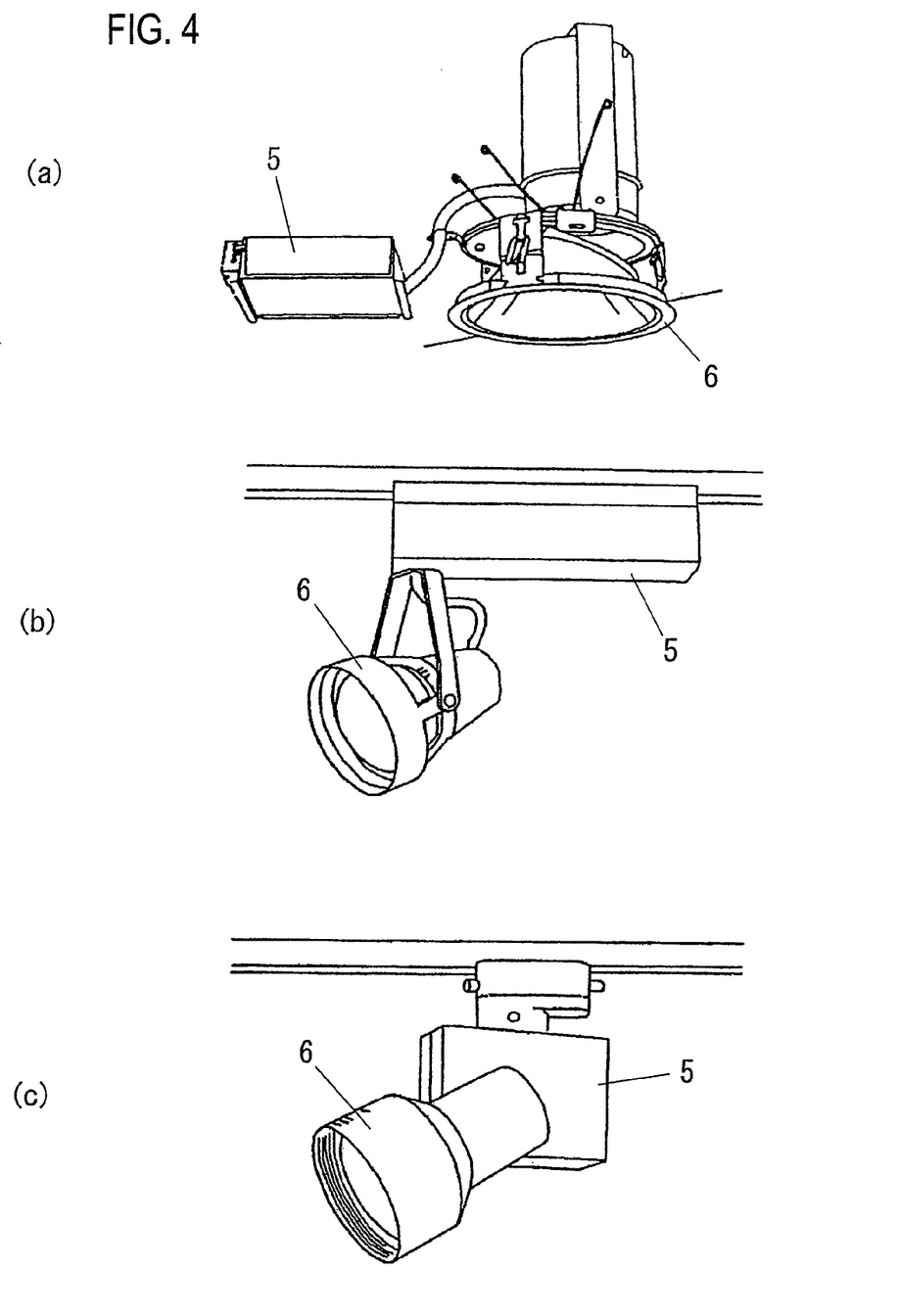
FIG. 4 is a perspective view of a lighting fixture using the aforementioned high-pressure discharge lamp lighting device.

The above-described high-pressure discharge lamp lighting device of this embodiment is applicable to lighting fixtures as shown in FIGS. 4(a) to 4(c), for example.

Each lighting fixture shown in FIGS. 4(a) to 4(c) includes an electrical ballast 5 containing the high-pressure discharge lamp lighting device of this embodiment, and a fixture body 6 for mounting the high-pressure discharge lamp DL to be lit by the high-pressure discharge lamp lighting device. Note that the lighting fixture shown in FIG. 4(a) is a downlight while the lighting fixtures shown in FIGS. 4(b) and 4(c) are spotlights.

According to the above-described lighting fixtures, it is possible to maintain lighting of the high-pressure discharge lamp upon occurrence of the instantaneous power failure, the instantaneous voltage drop, and the like, and to achieve downsizing at the same time. Note that the high-pressure discharge lamp lighting device to be used in the lighting fixtures shown in FIGS. 4(a) to 4(c) is not limited to the one according to this embodiment but may also be high-pressure discharge lamp lighting devices of second to fourth embodiments to be described later. Alternatively, it is possible to construct a lighting system by combining more than one of these lighting fixtures.

Second Embodiment

Figure 5:
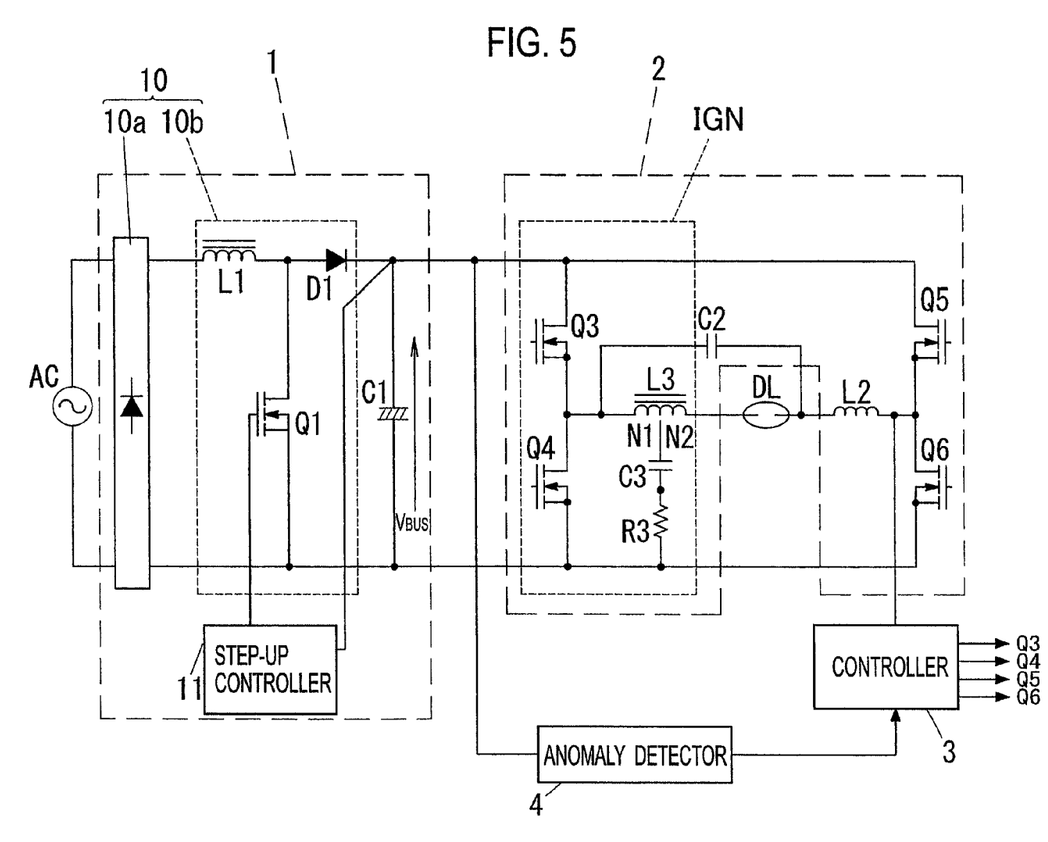
FIG. 5 is a circuit configuration diagram of a high-pressure discharge lamp lighting device according to a second embodiment.

As shown in FIG. 5, a high-pressure discharge lamp lighting device of this embodiment includes a direct current power circuit 1 that converts an alternating current voltage to be supplied form an alternating current power source AC into a direct current voltage, an output unit 2 that converts a direct current outputted from the direct current power circuit 1 into a square wave alternating current whose polarity is inverted at a prescribed frequency and that supplies the square wave alternating current to a high-pressure discharge lamp DL, a controller 3 that controls the output unit 2, and an anomaly detector 4 that detects an instantaneous drop in voltage (i.e., an instantaneous power failure or an instantaneous voltage drop) of the alternating current power source AC.

Here, the direct current power circuit 1 is similar to the one in the first embodiment whereas the output unit 2, the controller 3, and the anomaly detector 4 are different from those in the first embodiment. For this reason, the output unit 2, the controller 3, and the anomaly detector 4 will be described in this embodiment while description of the direct current power circuit 1 will be omitted herein.

As shown in FIG. 5, the output unit 2 of this embodiment includes a full-bridge circuit provided with a series circuit formed of switching elements Q3 and Q4 and with a series circuit formed of switching elements Q5 and Q6, the series circuits each connected in parallel to a smoothing capacitor C1. In this full-bridge circuit, a high-pressure discharge lamp DL is inserted between a connecting point of the switching element Q3 to the switching element Q4 and a connecting point of the switching element Q5 to the switching element Q6.

Meanwhile, a secondary winding N2 of a transformer T3 formed of an autotransformer is inserted between the connecting point of the switching element Q3 to the switching element Q4 and the high-pressure discharge lamp DL. A primary winding N1 of the transformer T3 is connected to a terminal on a low potential side of a rectifier 10a through a series circuit formed of a capacitor C3 and a resistor R3. That is, in the output unit 2 of this embodiment, the switching elements Q3 and Q4, the transformer T3, the capacitor C3, and the resistor R3 collectively constitute an ignition circuit IGN that supplies a starting voltage to the high-pressure discharge lamp DL. This ignition circuit IGN has a similar configuration to that in the first embodiment and description thereof will be omitted.

Moreover, in the output unit 2 of this embodiment, an inductor L2 is inserted between the high-pressure discharge lamp DL and the connecting point of the switching element Q5 to the switching element Q6. Further, a capacitor C2 is connected in parallel to the series circuit formed of the high-pressure discharge lamp DL and the secondary winding N2 of the transformer L3. In this output unit 2, the switching elements Q3 to Q6, the inductor L2, and the capacitor C2 collectively constitute a step-down chopper circuit.

The anomaly detector 4 of this embodiment detects an output voltage VBUS from the direct current power circuit 1 which is a voltage between both of terminals of a smoothing capacitor C1. Then, the anomaly detector 4 determines occurrence of an instantaneous drop in voltage such as an instantaneous power failure or an instantaneous voltage drop when the detected voltage (i.e., the output voltage VBUS) falls below a prescribed threshold Vth, and outputs an anomaly detection signal to the controller 3. The anomaly detector 4 determines that the instantaneous drop in voltage is terminated when the output voltage VBUS reaches and exceeds the threshold Vth after outputting the anomaly detection signal, and outputs a return signal to the controller 3. As described above, the anomaly detector 4 of this embodiment detects the output voltage VBUS from the direct current power circuit 1 and determines the occurrence of the instantaneous drop in voltage when this voltage (the detected voltage) VBUS falls below the threshold Vth. Hence it is possible to detect the instantaneous power failure or the instantaneous voltage drop by using a simple circuit configuration including a comparator and the like.

In this embodiment, the threshold Vth is defined as a value which is lower by a prescribed value provided for preventing false detection than the detected voltage (the output voltage VBUS) obtained in the normal state. The prescribed value for preventing false detection is the value which is greater than a variation value of the output voltage VBUS in the normal state. Such a variation value can be obtained by measuring an actual variation value of the output voltage VBUS, which is determined in consideration of a ripple voltage of the smoothing capacitor C1 and a minimum value of the output voltage VBUS in the normal state in this embodiment. For example, if the output voltage VBUS is 284±10 V and a ripple voltage width of the smoothing capacitor C1 is 15 V, then the variation value is set to 25 V while the threshold Vth is set to 259 V (=284 V−10 V−15 V). In this way, it is possible to suppress a case where a variation attributable to the ripple voltage of the smoothing capacitor C1 and a fluctuation of the output voltage VBUS are falsely detected as a variation attributable to the instantaneous power failure or the instantaneous voltage drop.

As similar to the first embodiment, the controller 3 of this embodiment includes, as a principal constituent, a microcomputer or the like configured to execute a variety of processing in accordance with a program stored in a memory, for example. However, contents of the on-off control of the switching elements Q2 to Q6 are different from those in the first embodiment.

As shown in FIGS. 6(c) to 6(f), the controller 3 of this embodiment performs control to turn the switching element Q5 on and off at a prescribed frequency (such as several tens of kilohertz) while turning the switching element Q4 on and turning the switching elements Q3 and Q6 off (i.e., operates the step-down chopper circuit). In this way, a triangular wave current IL2 flows on the inductor L2 as shown in FIG. 6(g), and this current IL2 is smoothed by the smoothing capacitor C2 and is supplied to the high-pressure discharge lamp DL as a current Ila (see FIG. 6(h)). In addition, the controller 3 of this embodiment performs control to turn the switching element Q6 on and off at a prescribed frequency (such as several tens of kilohertz) while turning the switching element Q3 on and turning the switching elements Q4 and Q5 off. In this way, the triangular wave current IL2 flows on the inductor L2 as shown in FIG. 6(g), and this current IL2 is smoothed by the smoothing capacitor C2 and is supplied to the high-pressure discharge lamp DL as a current Ila (see FIG. 6(h)). However, in this case, the current flows in an opposite direction to the case of performing on-off control of the switching element Q5.

Therefore, the controller 3 of this embodiment supplies a square wave alternating current to the high-pressure discharge lamp DL by alternately repeating the control to turn the switching element Q5 on and off at the prescribed frequency while turning the switching element Q4 on and turning the switching elements Q3 and Q6 off (the control to supply the positive current Ila to the high-pressure discharge lamp DL, hereinafter referred to as "positive current supply control") and the control to turn the switching element Q6 on and off at the prescribed frequency while turning the switching element Q3 on and turning the switching elements Q4 and Q5 off (the control to supply the negative current Ila to the high-pressure discharge lamp DL, hereinafter referred to as "negative current supply control"). Moreover, the magnitude of the square wave alternating current (i.e., the magnitude of the current Ila) is determined by an on-off frequency of the switching element Q5 when the polarity is positive and by an on-off frequency of the switching element Q6 when the polarity is negative. Brightness of the high-pressure discharge lamp DL is determined by the magnitude of the current Ila.

The output unit 2 of this embodiment also includes the ignition circuit IGN as similar to the first embodiment. When lighting the high-pressure discharge lamp DL as in the first embodiment, the controller 3 operates in the starting mode of causing the ignition circuit IGN to apply the starting voltage between the electrodes of the high-pressure discharge lamp DL.

Then, after causing a breakdown in the high-pressure discharge lamp DL, the controller 3 operates in the normal lighting mode of controlling the output unit 2 so that the output unit 2 supplies the square wave alternating current to the high-pressure discharge lamp DL.

Figure 6:
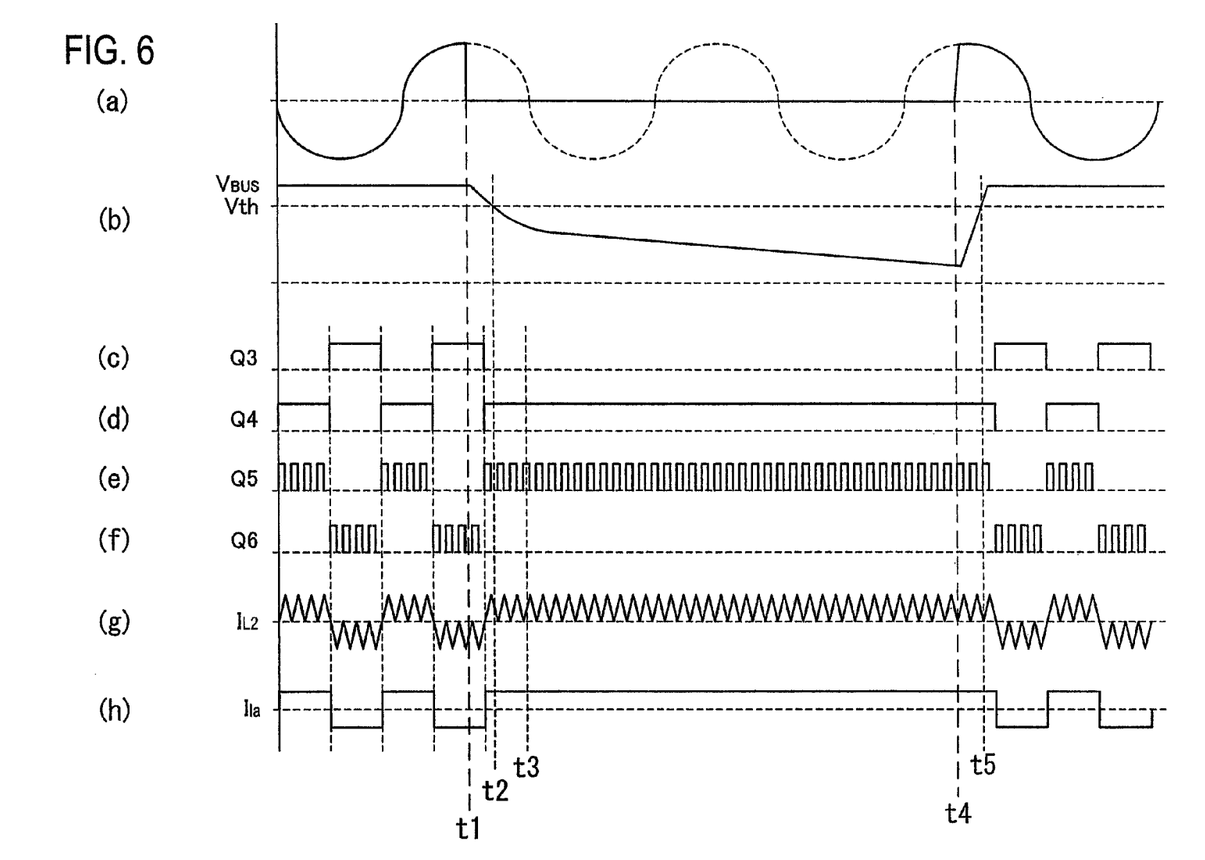
FIG. 6 is a waveform chart for explaining operations of the aforementioned high-pressure discharge lamp lighting device.

In the normal lighting mode, the controller 3 repeats the positive current supply control and the negative current supply control alternately at the prescribed cycle as described previously, thereby converting the current Ila into the square wave alternating current of the prescribed frequency as shown in FIG. 6(h) and supplying the alternating current to the high-pressure discharge lamp DL. Thus, the high-pressure discharge lamp DL is lit stably.

Meanwhile, the controller 3 switches to a lighting maintained mode upon receipt of the anomaly detection signal from the anomaly detector 4 (i.e., when the instantaneous drop in voltage is detected by the anomaly detector 4) during the operation in the normal lighting mode. In this lighting maintained mode, the controller 3 does not alternately repeat the positive current supply control and the negative current supply control, but controls the output unit 2 so that the output unit 2 supplies a current having a fixed polarity (a fixed polarity current) to the high-pressure discharge lamp DL. For example, the controller 3 of this embodiment causes the square wave alternating current having the frequency of 170 Hz to be supplied in the normal lighting mode and causes the fixed polarity current having the same polarity as the immediately preceding polarity of the square wave alternating current to be supplied in the lighting maintained mode. To be more precise, when the controller 3 receives the anomaly detection signal during the positive current supply control, the controller 3 continues performing the positive current supply control without switching from the positive current supply control to the negative current supply control (see FIGS. 6(c) to 6(h)). In the meantime, when the controller 3 receives the anomaly detection signal during the negative current supply control, the controller 3 continues performing the negative current supply control without switching from the negative current supply control to the positive current supply control.

As described above, the output unit 2 of this embodiment converts the direct current obtained from the direct current power circuit 1 either into the square wave alternating current whose polarity is inverted at the prescribed frequency or into the fixed polarity current having the fixed polarity, and supplies the current to the high-pressure discharge lamp DL.

Moreover, the controller 3 switches from the lighting maintained mode to the normal lighting mode upon receipt of the return signal from the anomaly detector 4 (i.e., when the anomaly detector 4 determines that the instantaneous drop in voltage is terminated) during the operation in the lighting maintained mode.

Now, with reference to FIGS. 6(a) to 6(h), description is given below of an operation of the high-pressure discharge lamp lighting device of this embodiment, particularly, of an operation when the instantaneous power failure, the instantaneous voltage drop or the like occurs in the alternating current power source AC.

First, when the controller 3 operates in the normal lighting mode, the controller 3 alternately repeats the positive current supply control and the negative current supply control as shown in FIGS. 6(c) to 6(f). Thus, the square wave alternating current is supplied to the high-pressure discharge lamp DL (see FIGS. 6(g) and 6(h)).

Here, if there is an instantaneous power failure of the alternating current power source AC (time t1 in FIG. 6(a)), electric potential at the terminal on the high potential side of the rectifier 10a is decreased and the output voltage VBUS is eventually decreased as well (see FIG. 6(b)). Then, as the output voltage VBUS falls below the threshold Vth (time t2), the anomaly detector 4 outputs the anomaly detection signal to the controller 3. Upon receipt of the anomaly detection signal, the controller 3 switches from the normal lighting mode to the lighting maintained mode (time t3). Thus, the fixed polarity current having the positive polarity (the current Ila) is supplied to the high-pressure discharge lamp DL.

Thereafter, when the alternating current power source AC returns from the instantaneous power failure (time t4 in FIG. 6(a)), the electric potential at the terminal on the high potential side of the rectifier 10a is increased and the output voltage VBUS is eventually increased (see FIG. 6(b)). When the output voltage VBUS reaches and exceeds the threshold Vth (time t5), the anomaly detector 4 outputs the return signal to the controller 3. Upon receipt of the return signal, the controller 3 switches from the lighting maintained mode to the normal lighting mode.

As described above, according to the high-pressure discharge lamp lighting device of this embodiment, when the instantaneous drop in voltage is detected by the anomaly detector 4, the controller 3 switches from the normal lighting mode of controlling the output unit 2 so that the square wave alternating current is supplied to the high-pressure discharge lamp DL, to the lighting maintained mode of controlling the output unit 2 so that the output unit 2 supplies the high-pressure discharge lamp DL with the fixed polarity current having the fixed polarity.

According to the high-pressure discharge lamp lighting device of this embodiment, the fixed polarity current having the fixed polarity is supplied to the high-pressure discharge lamp DL instead of the square wave alternating current upon occurrence of an instantaneous power failure, an instantaneous voltage drop, and the like. Hence, unlike the normal lighting mode, the polarities are not inverted. Therefore, the restriking voltage attributable to the polarity inversion is not generated any more. Accordingly, it is possible to prevent extinction of the high-pressure discharge lamp DL due to the restriking voltage and to maintain lighting of the high-pressure discharge lamp DL. Moreover, it is not necessary to increase the capacity of the smoothing capacitor C1 provided in the direct current power circuit 1, thereby enabling downsizing as a whole.

In addition, the anomaly detector 4 detects the output voltage VBUS from the direct current power circuit 1 and determines that the instantaneous drop in voltage is terminated when the detected voltage (i.e., the output voltage VBUS) reaches and exceeds the threshold Vth after the detected voltage falls below the threshold Vth, and outputs the return signal to the controller 3. Upon receipt of the recover signal, the controller 3 switches from the lighting maintained mode to the normal lighting mode.

Accordingly, the mode is automatically switched from the lighting maintained mode to the normal lighting mode when the instantaneous power failure or the instantaneous voltage drop is resolved. Hence it is not necessary to perform an operation to switch from the lighting maintained mode to the normal lighting mode manually, thereby improving usability.

Incidentally, the anomaly detector 4 of this embodiment considers the minimum value of the output voltage VBUS in the normal state and the ripple voltage of the smoothing capacitor C1 upon determination of the threshold Vth. Here, the anomaly detector 4 may further consider product variation (product variation in the initial state) in capacitance of the smoothing capacitor C1 and product life. For example, assuming that the production variation in the capacitance of the smoothing capacitor C1 is 20% and that reduction in the capacitance at a final stage of the product life is 20%, then it is possible to use a ripple voltage width of a capacitor having the 64% (80%×80%) capacitance of the smoothing capacitor C1 instead of the ripple voltage width of the smoothing capacitor C1. Here, if the ripple voltage width of the capacitor having 64% of the capacitance of the smoothing capacitor C1 is equal to 20 V, the variation value is set to 30 V while the threshold Vth is set to 254 V (=284 V−10 V−20 V).

In this way, it is possible to suppress a case where a variation of the output voltage VBUS attributable to the product variation or the product life of the smoothing capacitor C1 is falsely detected as a variation attributable to the instantaneous power failure or the instantaneous voltage drop. Although the above-described example considers both of the product variation and the product life of the smoothing capacitor C1, it is also possible to consider only one of these factors.

Although the anomaly detector 4 of this embodiment detects the output voltage VBUS, the anomaly detector 4 may detect the voltage Vin obtained by smoothing the output voltage from the rectifier 10a as similar to the first embodiment. Alternatively, the anomaly detector 4 may detect both of the output voltage VBUS and the voltage Vin and detect the instantaneous power failure or the instantaneous voltage drop in consideration of the magnitudes of those voltages. This configuration may also apply to the first embodiment and to the third and fourth embodiments to be described later.

Third Embodiment

A high-pressure discharge lamp lighting device of this embodiment is different from the second embodiment in an operation of the controller 3, but other features are the same as the second embodiment. Accordingly, illustration and description of such similar configurations will be omitted herein.

A controller 3 of this embodiment is different from the second embodiment in an operation in the lighting maintained mode. However, operations in the normal lighting mode and in a starting mode are similar to those in the second embodiment and description thereof will be omitted.

Specifically, the controller 3 of this embodiment executes the positive current supply control in the lighting maintained mode and causes the output unit 2 to supply the current having the polarity thus fixed to positive (the fixed polarity current) to a high-pressure discharge lamp DL. That is, the controller 3 of the second embodiment continues the positive current supply control without switching to the negative current supply control when receiving the anomaly detection signal during the positive current supply control, and continues the negative current supply control without switching to the positive current supply control when receiving the anomaly detection signal during the negative current supply control. Instead, the controller 3 of this embodiment executes the positive current supply control when receiving the anomaly detection signal irrespective of whether the controller 3 is in the course of the positive current supply control or the negative current supply control.

Figure 7:
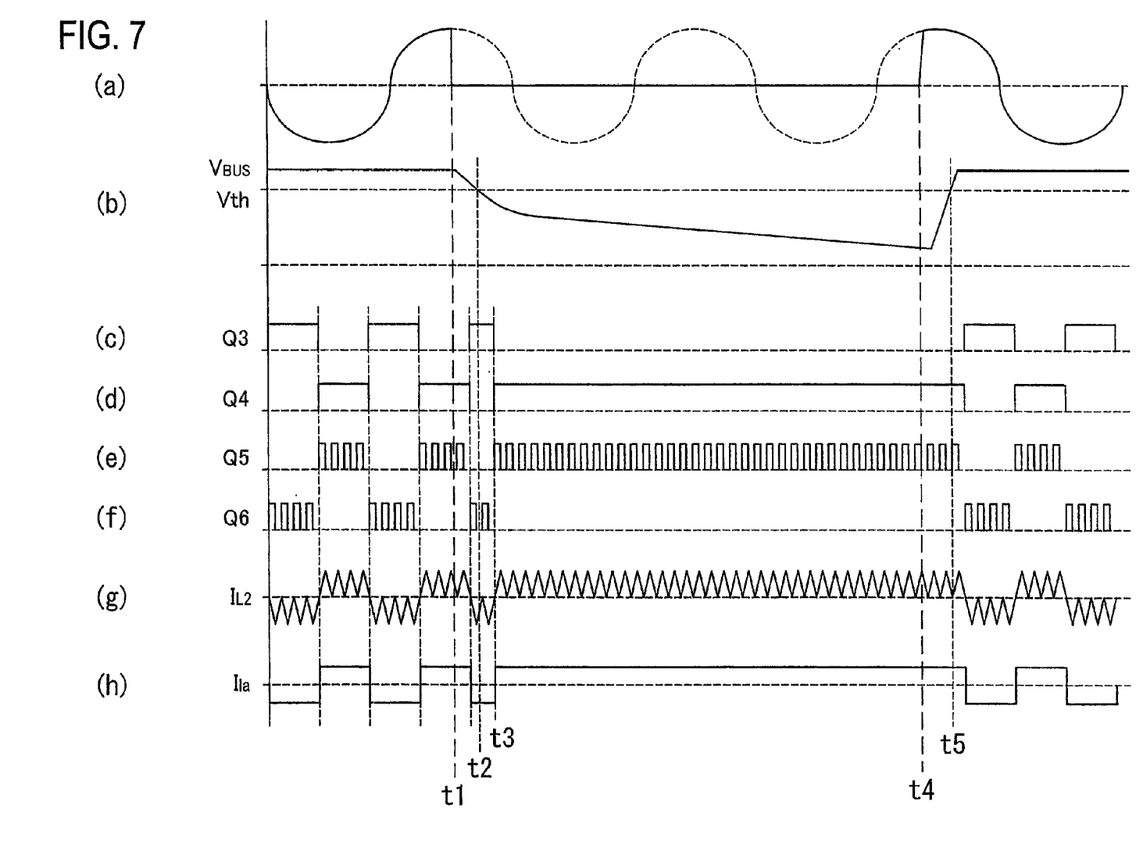
FIG. 7 is a waveform chart for explaining operations of a high-pressure discharge lamp lighting device according to a third embodiment.

Now, with reference to FIGS. 7(a) to 7(h), description is given below of an operation of the high-pressure discharge lamp lighting device of this embodiment, particularly, of an operation when the instantaneous power failure, the instantaneous voltage drop or the like occurs in the alternating current power source AC.

First, when the controller 3 operates in the normal lighting mode, the controller 3 alternately repeats the positive current supply control and the negative current supply control as shown in FIGS. 7(c) to 7(f). Thus, the square wave alternating current is supplied to the high-pressure discharge lamp DL, (see FIGS. 7(g) and 7(h)).

Here, if there is an instantaneous power failure of the alternating current power source AC (time t1 in FIG. 7(a)), the electric potential at the terminal on the high potential side of the rectifier 10a is decreased and the output voltage VBUS is eventually decreased as well (see FIG. 7(b)). Then, as the output voltage VBUS falls below the threshold Vth (time t2), the anomaly detector 4 outputs the anomaly detection signal to the controller 3. Upon receipt of the anomaly detection signal, the controller 3 switches from the normal lighting mode to the lighting maintained mode (time t3) and executes the positive current supply control. Hence the fixed polarity current having the positive polarity (the current Ila) is supplied to the high-pressure discharge lamp DL.

Thereafter, when the alternating current power source AC returns from the instantaneous power failure (time t4 in FIG. 7(a)), the electric potential at the terminal on the high potential side of the rectifier 10a is increased and the output voltage VBUS is eventually increased (see FIG. 7(b)). When the output voltage VBUS reaches and exceeds the threshold Vth (time t5), the anomaly detector 4 outputs the return signal to the controller 3. Upon receipt of the return signal, the controller 3 switches from the lighting maintained mode to the normal lighting mode.

As described above, according to the high-pressure discharge lamp lighting device of this embodiment, the controller 3 controls the output unit 2 such that the polarity of the fixed polarity current is constant (which is positive in this embodiment) irrespective of the immediately preceding polarity of the square wave alternating current.

In addition to the effect described in the second embodiment, according to the above-described high-pressure discharge lamp lighting device of this embodiment, the polarity of the fixed polarity current in the lighting maintained mode is constant irrespective of the immediately preceding polarity of the square wave alternating current when the mode is switched from the normal lighting mode to the lighting maintained mode. Hence it is possible to maintain lighting of the high-pressure discharge lamp DL without being influenced by the polarity of the square wave alternating current.

Particularly, the high-pressure discharge lamp lighting device of this embodiment is configured to perform the positive current supply control in which the switching element to be on-off controlled (to perform a chopping operation) in the lighting maintained mode is one located on a high side. Therefore, it is easier to charge a power source (the smoothing capacitor C1) as compared to a case of performing the negative current supply control in which the switching element to be on-off controlled (to perform the chopping operation) is one located on a low side. Hence it is possible to further reduce the capacity of the smoothing capacitor C1.

Here, in this embodiment, the fixed polarity current having the positive polarity is supplied to the high-pressure discharge lamp DL in the lighting maintained mode. However, there is no intention of eliminating a configuration in which the fixed polarity current having the negative polarity is supplied to the high-pressure discharge lamp DL. The point is that, the fixed polarity current only has to have a constant polarity irrespective of the immediately preceding polarity of the square wave alternating current.

Fourth Embodiment

A high-pressure discharge lamp lighting device of this embodiment is different from the second embodiment 2 in an operation of the controller 3, but other features are the same as the second embodiment. Accordingly, illustration and description of such similar configurations will be omitted herein.

A controller 3 of this embodiment is different from the second embodiment in an operation in the lighting maintained mode. However, operations in the normal lighting mode and in a starting mode are similar to those in the second embodiment and description thereof will be omitted.

Figure 8:
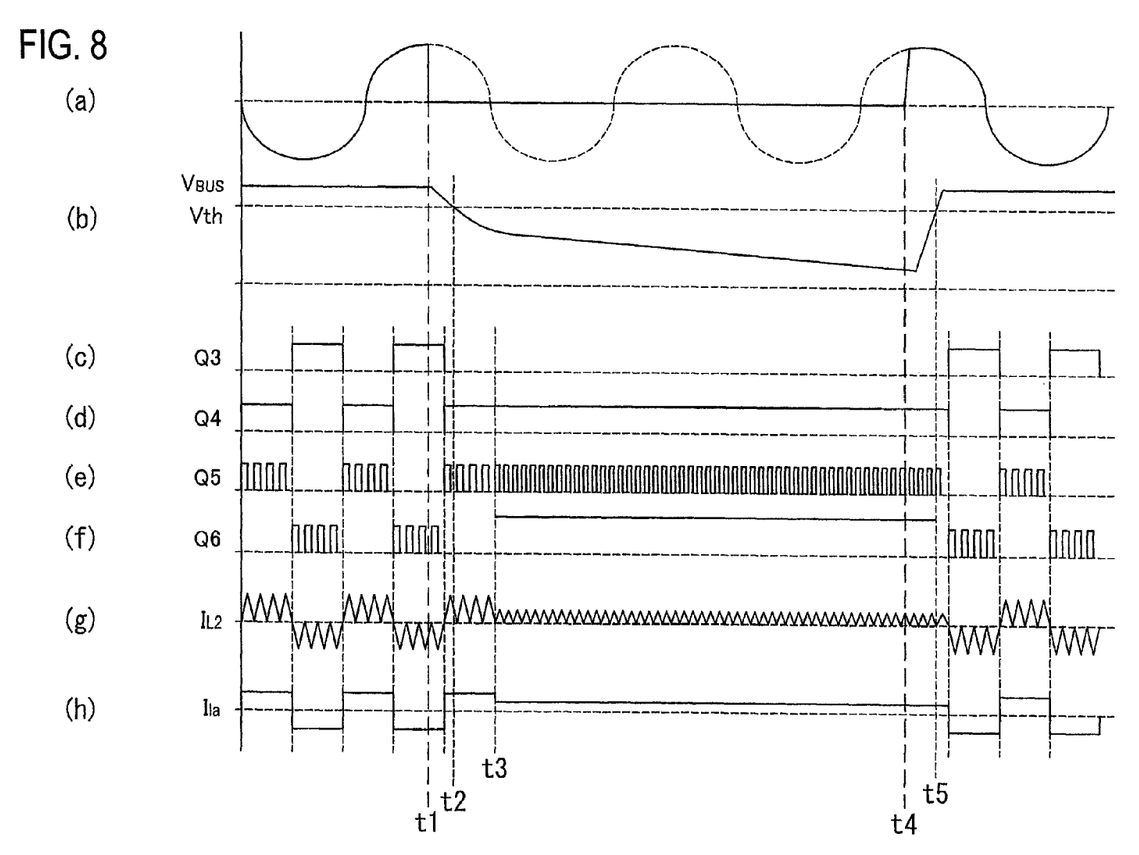
FIG. 8 is a waveform chart for explaining operations of a high-pressure discharge lamp lighting device according to a fourth embodiment.

Specifically, in the lighting maintained mode, the controller 3 of this embodiment controls the output unit 2 so that the high-pressure discharge lamp DL consumes a smaller amount of power in the lighting maintained mode than in the normal lighting mode. To be more precise, in the lighting maintained mode, the controller 3 renders the on-off frequency of the on-off controlled switching elements (the switching elements Q5 and Q6) higher than that in the normal lighting mode. Thus, a peak of the current IL2 is reduced and the current Ila is reduced (see FIGS. 8(g) and 8(h)).

Now, with reference to FIGS. 8(a) to 8(h), description is given below of an operation of the high-pressure discharge lamp lighting device of this embodiment, particularly, of an operation when the instantaneous power failure, the instantaneous voltage drop or the like occurs in the alternating current power source AC.

First, when the controller 3 operates in the normal lighting mode, the controller 3 alternately repeats the positive current supply control and the negative current supply control as shown in FIGS. 8(c) to 8(f). Thus, the square wave alternating current is supplied to the high-pressure discharge lamp DL (see FIGS. 8(g) and 8(h)).

Here, if there is an instantaneous power failure of the alternating current power source AC (time t1 in FIG. 8(a)), the electric potential at the terminal on the high potential side of the rectifier 10a is decreased and the output voltage VBUS is eventually decreased as well (see FIG. 8(b)). Then, as the output voltage VBUS falls below the threshold Vth (time t2), the anomaly detector 4 outputs the anomaly detection signal to the controller 3. Upon receipt of the anomaly detection signal, the controller 3 switches from the normal lighting mode to the lighting maintained mode (time t3) and supplies the fixed polarity current having the positive polarity (the current Ila) to the high-pressure discharge lamp DL. At the same time, the on-off frequency of the switching element Q5 is set higher than the frequency in the normal lighting mode, thereby reducing the peak of the current IL2 and reducing the current Ila (see FIGS. 8(g) and 8(h)).

Thereafter, when the alternating current power source AC returns from the instantaneous power failure (time t4 in FIG. 8(a)), the electric potential at the terminal on the high potential side of the rectifier 10a is increased and the output voltage VBUS is eventually increased (see FIG. 8(b)). When the output voltage VBUS reaches and exceeds the threshold Vth (at time t5), the anomaly detector 4 outputs the return signal to the controller 3. Upon receipt of the return signal, the controller 3 switches from the lighting maintained mode to the normal lighting mode.

As described above, according to the high-pressure discharge lamp lighting device of this embodiment, the controller 3 controls the output unit 2 so that the high-pressure discharge lamp DL consumes a smaller amount of power in the lighting maintained mode than in the normal lighting mode.

In addition to the effect described in the second embodiment, according to the above-described high-pressure discharge lamp lighting device of this embodiment, it is possible to make a step-down rate of the voltage (a discharge rate) of the smoothing capacitor C1 in the lighting maintained mode (i.e., upon an instantaneous power failure or an instantaneous voltage drop of the alternating current power source AC) slower than the case of the second embodiment. Hence it is possible to further reduce the capacity of the smoothing capacitor C1 and to achieve further downsizing.

Here, the on-off frequency of the switching elements Q5 and Q6 in the lighting maintained mode only needs to be higher than that in the normal lighting mode. The degree of the difference in the on-off frequency may be appropriately set up from various and broad points of view including the capacity of the smoothing capacitor C1, the type of the high-pressure discharge lamp DL, and so forth. The degree may be appropriately set up so as not to cause extinction of the high-pressure discharge lamp DL upon the instantaneous power failure or the instantaneous voltage drop of the alternating current power source AC. Moreover, the operation of the controller 3 of this embodiment (i.e., the operation to control the output unit 2 so that the high-pressure discharge lamp DL consumes a smaller amount of power in the lighting maintained mode than in the normal lighting mode) is also applicable to the first and third embodiments. If this operation is applied to the first embodiment, the on-off frequency of the switching elements Q2 may be set higher than that in the normal lighting mode instead of the frequency of the switching elements Q5 and Q6.

INDUSTRIAL APPLICABILITY

The present invention can be used as a technique to maintain lighting of a high-pressure discharge lamp even upon occurrence of an instantaneous power failure, an instantaneous voltage drop, and the like.

EXPLANATION OF REFERENCE NUMERALS

1 DIRECT CURRENT POWER CIRCUIT
2 OUTPUT UNIT
3 CONTROLLER
4 ANOMALY DETECTOR
5 FIXTURE BODY
10 AC-DC CONVERSION CIRCUIT
DL HIGH-PRESSURE DISCHARGE LAMP
C1 SMOOTHING CAPACITOR
AC ALTERNATING CURRENT POWER SOURCE

The invention claimed is:

1. A lighting device for a high-pressure discharge lamp, comprising:
a direct current power circuit configured to convert an alternating current voltage supplied from an alternating current power source into a direct current voltage;
an output unit configured to convert a direct current obtained from the direct current power circuit into a square wave alternating current whose polarity is inverted at a prescribed frequency and to supply the square wave alternating current to the high-pressure discharge lamp;
a controller configured to control the output unit; and
an anomaly detector configured to detect an instantaneous drop in voltage of the alternating current power source,
wherein the controller is configured in a normal lighting mode to control the output unit so that the output unit supplies the high-pressure discharge lamp with a square wave alternating current,
wherein the controller is configured in a lighting maintained mode to control the output unit so that the output unit supplies the high-pressure discharge lamp with a square wave alternating current having a lower frequency than the square wave alternating current in the normal lighting mode, and
wherein the controller is configured upon detection of an instantaneous drop in voltage by the anomaly detector in the normal lighting mode to switch from the normal lighting mode to the lighting maintained mode.

2. The lighting device for the high-pressure discharge lamp according to claim 1,
wherein the controller is configured to control the output unit so that the high-pressure discharge lamp consumes a smaller amount of power in the lighting maintained mode than in the normal lighting mode.

3. The lighting device for the high-pressure discharge lamp according to claim 1,
wherein the anomaly detector is configured to detect at least one of a voltage corresponding to the voltage of the alternating current power source and an output voltage from the direct current power circuit, and upon drop of the detected voltage to a value below a prescribed threshold to determine occurrence of the instantaneous drop in voltage.

4. The lighting device for the high-pressure discharge lamp according to claim 3, wherein
the anomaly detector is configured to determine termination of the instantaneous drop in voltage upon rise of the detected voltage to a value greater than or equal to the prescribed threshold following the drop of the detected voltage to a value below the prescribed threshold, and
the controller is configured to switch from the lighting maintained mode to the normal lighting mode upon determination of the termination of the instantaneous drop in voltage by the anomaly detector.

5. The lighting device for the high-pressure discharge lamp according to claim 3, wherein the prescribed threshold is a value being lower than the detected voltage in a normal state by a prescribed value for prevention of false detection.

6. A lighting fixture, comprising:
a lighting device for a high-pressure discharge lamp including
a direct current power circuit configured to convert an alternating current voltage supplied from an alternating current power source into a direct current voltage,
an output unit configured to convert a direct current obtained from the direct current power circuit into a square wave alternating current whose polarity is inverted at a prescribed frequency and to supply the square wave alternating current to the high-pressure discharge lamp,
a controller configured to control the output unit, and
an anomaly detector configured to detect an instantaneous drop in voltage of the alternating current power source,
wherein the controller is configured in a normal lighting mode to control the output unit so that the output unit supplies the high-pressure discharge lamp with a square wave alternating current,
wherein the controller is configured in a lighting maintained mode to control the output unit so that the output unit supplies the high-pressure discharge lamp with a square wave alternating current having a lower frequency than the square wave alternating current in the normal lighting mode, and
wherein the controller is configured upon detection of an instantaneous drop in voltage by the anomaly detector in the normal lighting mode to switch from the normal lighting mode to the lighting maintained mode; and
a fixture body for mounting the high-pressure discharge lamp to be lit by the lighting device for the high-pressure discharge lamp.

* * * * *